April 28, 1970   W. V. C. VAN BEEK   3,508,437
DEVICE FOR DETERMINING THE INTERNAL FRICTION OF MATERIALS
Filed March 15, 1967
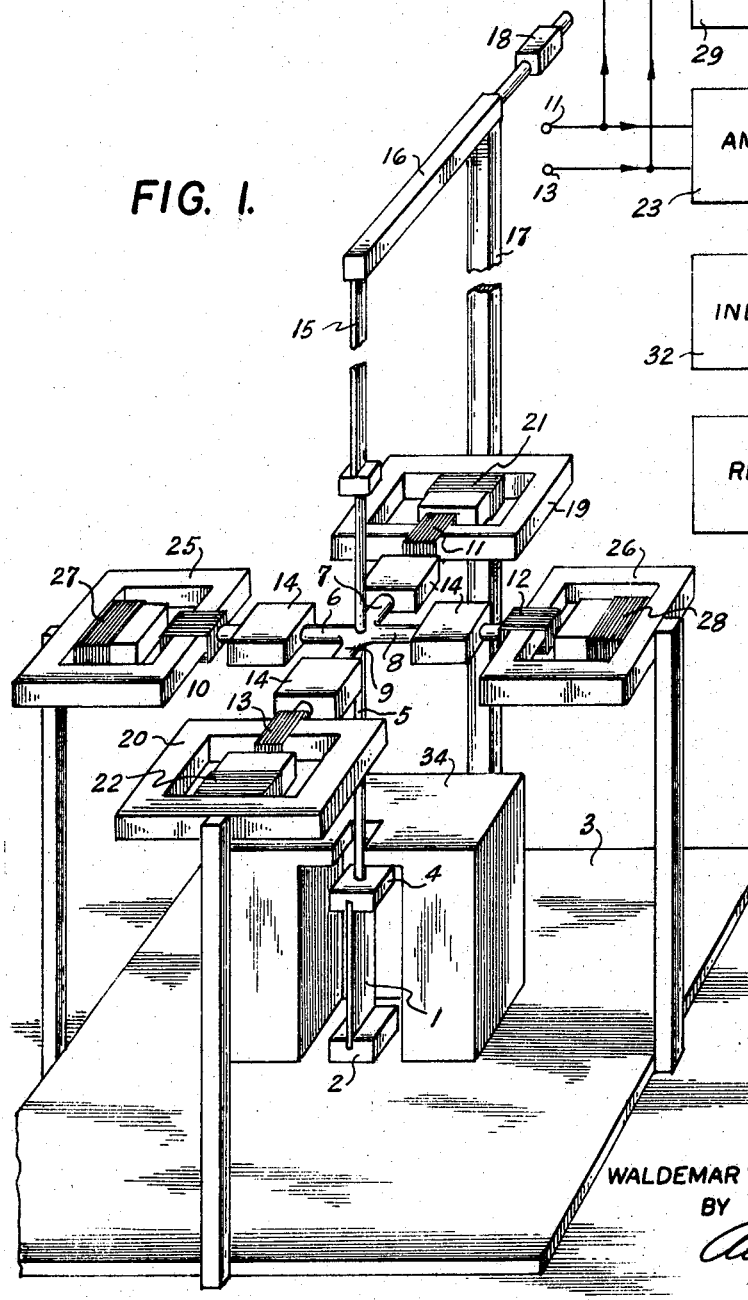
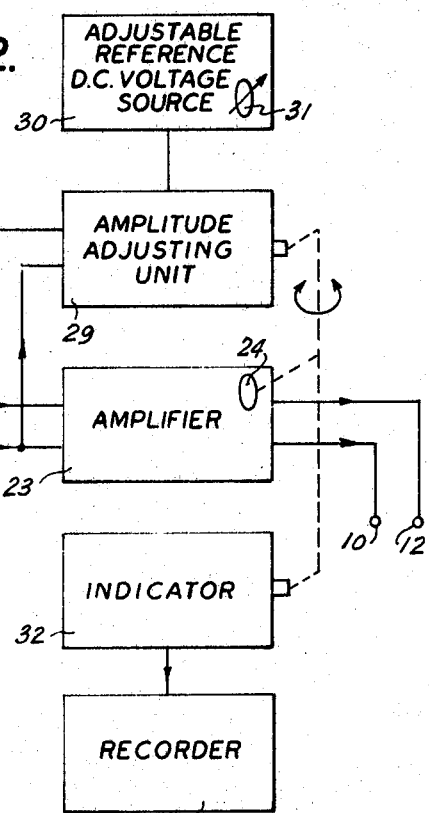
INVENTOR
WALDEMAR VICTOR CONRAD VAN BEEK
BY
ATTORNEY 3,508,437
DEVICE FOR DETERMINING THE INTERNAL FRICTION OF MATERIALS
Waldemar Victor Conrad van Beek, Bussum, Netherlands, assignor to Koninklijke Zwavelzuurfabrieken Voorheen Ketjen N.V., Amsterdam, Netherlands, a limited-liability company of the Netherlands
Filed Mar. 15, 1967, Ser. No. 623,360
Claims priority, application Netherlands, Mar. 16, 1966, 6603438
Int. Cl. G01n
U.S. Cl. 73—67.2   9 Claims

ABSTRACT OF THE DISCLOSURE

In a device for determining the internal friction of materials by a torsional oscillator periodically twisting a test piece of the material in question which supplies at least a part of the force for restoring the oscillator to its neutral position, electrical signals proportional to the instantaneous velocity of the oscillator are employed to drive the latter after amplification of such signals, and the degree of amplification is regulated, for example, in response to deviation of electrical signals dependent on the actual amplitude of oscillation relative to a reference signal corresponding to a pre-set amplitude, so as to maintain the pre-set amplitude of oscillation, whereby the degree of amplification is at all times a function of the internal friction or damping effect of the test material.

---

This invention relates generally to devices for determining the internal friction or damping effect of materials.

It has been proposed for example, in French Patent No. 1,366,170, which corresponds to U.S. Patent No. 3,313,148, to provide a device for the above purpose in which a test piece of the material in question is periodically twisted by a torsional oscillator and supplies at least a part of the force for restoring the oscillator to its neutral position. In the known device, electrical signals are generated corresponding to the instaneous values of a characteristic of the oscillator, and such signals are amplified and fed back to drive the oscillator. The degree of amplification of the fed-back signals is automatically regulated in dependence on deviation of signals corresponding to the actual amplitude of oscillation relative to a reference signal representing a pre-set amplitude so as to maintain the actual amplitude, and hence the torsional deformation of the test piece, at the pre-set value. Further, in the existing device compensation for the damping effect of the test piece is effected by an external force applied to the oscillator and having a magnitude proportional to the instantaneous amplitude of the deflection of the oscillator from its neutral position, and hence proportional to the instantaneous deformation of the test piece, and there is measured the energy that has to be applied to the test piece, as by amplification of the fed-back signals, in order to maintain the amplitude torsional deformation of the test piece at the pre-set value.

In the case of materials having small values of internal friction, the measured energy is reliably a function of the internal friction of the material forming the test piece. However, in the case of materials having high values of internal friction and thus exerting considerable damping effects, for example, as encountered with polymers in the transition zone, whether of plastic resins or rubbers, it has been found that the application of a compensating force which, at any instant, is proportional to the instantaneous amplitude of deflection of the oscillator from its neutral position gives rise to important problems that are difficult to solve in actual practice. Such problems arise from the fact that the damping effect of the test piece is velocity-dependent, that is, proportional to the instantaneous velocity of the oscillator. If the force intended to compensate for the damping effect is made proportional to the instantaneous amplitude, as in the mentioned prior patent, the effect thereof is to change the restoring force from that produced by the test piece, and therefore to change the actual frequency of oscillation of the oscillator from the resonance frequency of the system which is determined by the inertia thereof and by the restoring force of the suspension and the test piece. Thus, in the case of materials exerting considerable damping effects, the prior art device operates at an actual frequency of oscillation substantially greater than the resonance frequency. By reason of the foregoing, it becomes necessary to feed energy to the system not only to overcome the damping effect but also to supply the excess energy required to achieve the pre-set amplitude at the frequency greater than the resonance frequency, so that the accuracy of the measurement of internal friction is adversely influenced. If, apart from the damping effect, the stiffness of the material is also of interest, the compensation for stiffness also adversely influence the determination thereof.

With the known device, it is only possible to measure accurately at a number of known frequencies of torsional oscillation, for which frequencies the amplifiers are expressly designed, and this complicates the measurement of the internal friction.

Even apart from the above disadvantages of the existing device when used for the testing of materials, such as, rubber, having high damping effects and/or low stiffness values, such device is unsuitable for the measurement of the variations of damping effect and/or stiffness of a material as functions of temperature changes, for example, between −150° C. and +200° C., over which range of temperatures the stiffness value of rubber has a variation of the order of $10^4$.

Accordingly, it is an object of this invention to avoid the above mentioned disadvantages of the existing device by employing a different compensating arrangement, whereby it is possible to accurately measure large as well as small values of internal friction or damping effect in test materials.

Another object is to avoid influencing of the the oscillating frequency by the compensating arrangement, so that operation at the resonance frequency remains available for determining the torsional modulus of elasticity of the test material.

In accordance with the invention, compensation for the damping effect of the test piece is simply effected by exerting a driving force on the torsional oscillator which, at any instant, is proportion to the instantaneous velocity of the oscillator. Such driving force is advantageously produced by electrical signals proportional to the instantaneous velocity of the oscillator and being subjected to a degree of amplification regulated, for example, in response to deviation of electrical signals dependent on the actual amplitude of oscillation from a reference signal corresponding to a pre-set amplitude, so as to maintain the pre-set amplitude of oscillation.

It is a feature of the device according to this invention that the torsional oscillator oscillates continuously at a resonance frequency determined solely by the stiffness of rigidity of the system, consisting of the sum of the small, known stiffness of the suspension and the relatively larger, dominant stiffness of the test material, and by the polar mass inertia moment applied to the system.

The above, and other objects, features and advantages of the invention, will be apparent in the following detailed description of an illustrative embodiment thereof which is to be read in connection with the accompanying drawings, wherein:

FIG. 1 is a perspective view of a device according to the invention; and

FIG. 2 is a schematic view of circuit components used with the device of FIG. 1.

Referring to FIG. 1, it will be seen that, in a device embodying this invention, a test piece 1 in the form of a strip of the material to be examined has its lower end secured by a suitable clamp 2 to the base or frame 3 of the device. The upper end of test piece 1 is secured by a clamp 4 to the lower end of a rod 5. Four arms 6, 7, 8 and 9 radiate from rod 5 at right angles to each other and to the rod and are rigid with respect to the latter. Electrical coils 10, 11, 12 and 13 are fixed to the outer ends of arms 6, 7, 8 and 9, respectively, with the axis of each coil extending perpendicular to the related arm in a plane containing all four arms. Blocks 14 are slidable on arms 6, 7, 8 and 9 and are locked in adjusted positions along the latter, for example by set screws (not shown). The blocks 14 may be displaced to adjust the polar mass inertia moment of the oscillating part of the device to a desired value. Further, the blocks 14 may be displaced to locate the center of gravity of the oscillating part precisely in the oscillating axis thereof.

The rod 5 is suspended, at its upper end, for oscillation about its longitudinal axis by means of a thin, non-extensible strip 15, the twisting of which gives rise to a restoring moment that is negligible relative to the restoring moment resulting from twisting of the best piece 1, and is precisely known. The suspension strip 15 depends from one end of a balance arm 16 which is suitably pivoted intermediate its ends on a knife-blade fulcrum (not shown) mounted at the upper end of a post 17 extending rigidly from base 3. The other end portion of balance arm 16 carries a counter-weight 18 which is adjustable therealong so that the weight of all of the described parts from the upper end of test piece 1 up to and including arm 16 exerts either no force, or an extremely small, known force, on the test piece. The rod 5 is seen to constitute a torsional oscillator which, when oscillating about its longitudinal axis causes periodic twisting of test piece 1 connected thereto.

The coils 11 and 13 are movable, in response to oscillation of rod 5 about its axis, in stationary magnetic fields established in the air gaps of iron yokes 19 and 20 by the supplying of a constant D.C. current from a source (not shown) to associated field coils 21 and 22, respectively. Such movement of coils 11 and 13 induces voltages therein which, at any instant, are proportional to the instantaneous velocity of the oscillation of rod 5. The coils 11 and 13 are connected through extremely slack wires (not shown), which exert no effect or a negligible known effect on the stiffness of the oscillating system, to the input terminals of a power amplifier 23 (FIG. 2) which thereby receives, as its input, an alternating current signal at the frequency of oscillation of rod 5 and which has, at any instant, a magnitude proportional to the instantaneous velocity of oscillation.

The amplifier 23 amplifies such input signal to an adjustable extent or degree, for example, as determined by the adjustment of a gain control or knob 24, and there emerges from the output terminals of the amplifier an alternating output current which is precisely proportional to and in phase with the input signals from coils 11 and 13. The output terminals of amplifier 23 are connected through extremely slack wires (not shown), which exert no effect or a negligible known effect on the stiffness of the oscillating system, to coils 10 and 12 which are freely movable in stationary magnetic fields established in the air gaps of iron yokes 25 and 26 by the supplying of a constant D.C. current from a source (not shown) to associated field coils 27 and 28. Thus, the amplified signals proportional to the instantaneous velocity of the oscillator are fed back to coils 10 and 12 and, in passing through the latter perpendicular to the respective magnetic fields, give rise to forces acting on coils 10 and 12 parallel to their axes, which forces are linearly dependent on the currents passing through the coils. The forces acting on coils 10 and 12 exert a turning movement on rod 5 to drive the latter in oscillation, and which, at any instant, is proportional to the instantaneous angular velocity of the rod.

Since the velocity dependent signals generated in coils 11 and 13 are fed back, after amplification, to coils 10 and 12 for driving the oscillator, it is important that the signals from coils 11 and 13 not be influenced to any significant extent by vibrations or air currents acting on the oscillator. It will be apparent that vibrations of rod 5 parallel to the aligned axes of arms 7 and 9 will be in the direction of the magnetic field produced in the air gap of each of yokes 19 and 20 and thus will not induce voltages in coils 11 and 13. The coils 11 and 13 are connected so that the voltages induced therein in response to their movements in opposite directions transversely with respect to the respective magnetic fields upon oscillation of rod 5 are added together for feeding to the input of amplifier 23. Vibrations of rod 5 tending to displace coils 11 and 13 simultaneously in the same direction transversely with respect to the magnetic fields induce voltages in such coils which are opposite and equal, thereby to cancel each other, assuming that coils 11 and 13 and their respective fields are identical. Thus, the driving forces exerted on coils 10 and 12 in proportion to the instantaneous velocity of rod 5 are substantially uninfluenced by vibrations or air currents acting on the rod.

The driving forces acting on coils 10 and 12, while being varied in dependence on the instantaneous velocity of the oscillator, are controlled in magnitude to maintain the amplitude of oscillation at a predetermined value, for example, by suitably adjusting the setting of knob 24 and thereby varying the gain or degree of amplification of the velocity dependent signals from coils 11 and 13 before the amplified signals are fed back from amplifier 23 to coils 10 and 12.

In the embodiment illustrated by the block diagram of FIG. 2, the velocity dependent signals from coils 11 and 13 are also received by an amplitude adjusting unit 29. Unit 29 includes a conventional electrical integrating circuit, for example, as disclosed in "Handbook for Operational Amplifier Applications" edited by Burr-Brown Research Corporation, page 16, which integrates the velocity dependent signals so as to derive therefrom signals depending on the angular deflection of rod 5. Unit 29 further has a track and hold modulator, for example, of the type available commercially from Philbrick Researches, Inc., Dedham, Mass., under the designation Model SPT&H, which holds the maximum value or peak of the deflection dependent signal in each period for comparison, in a conventional adder circuit, with a D.C. reference voltage or signal received from a source 30 and being pre-set, as by a control knob 31, to a value corresponding to a desired amplitude of oscillation. The unit 29 further includes a conventional electrical servomechanism which, in response to a deviation of the maximum or peak of the deflection dependent signal from the reference signal, actuates the control 24 of amplifier 23 to adjust the gain of the latter, and thereby adjust the magnitudes of the amplified velocity dependent signals fed to coils 10 and 12, in the sense for restoring the actual amplitude of oscillation to the desired value.

Since the order of magnitude of the frequency of oscillation of rod 5 is 1 Hz. (1 cycle/sec.), it is necessary that special precautions be observed in selecting the electrical amplifiers used in the power amplifier 23 and the amplitude adjusting unit 29. For this purpose, it is advantageous to use D.C. voltage amplifiers which are compensated for drift.

When compensation is effected in accordance with the invention by making the driving forces for the oscillator dependent on the instantaneous velocity thereof, as described above, the adjusted position of the amplifier control knob 24 for maintaining the pre-set amplitude of oscillation is reliably a function of the damping moment of the test piece 1 which is periodically twisted by oscillation of rod 5, and hence a function of the internal friction of the material forming the test piece. The adjusted position of control knob 24 may be indicated by a conventional angle indicating mechanism 32 actuated simultaneously with the knob 24 by the described electrical servo-mechanism of unit 29. Further, the position of knob 24, as indicated by mechanism 32, may be recorded by a conventional recorder 33 operated from the latter.

If desired, a temperature regulating device 34 may be provided around test piece 1 (FIG. 1) to vary the temperature of the latter during its periodic twisting. The temperature regulating device 34 may be designed to vary the temperature of the test piece automatically in accordance with a predetermined program, for example, from −150° C., which is the boiling point of liquid nitrogen, to +200° C., whereby the internal friction and stiffness of the material forming test piece 1 can be determined for the temperatures within such range.

Obviously, if the movement of the card or chart of recorder 33 is made dependent upon the temperature of the test piece, then there is obtained on the card or chart a direct graphic representation of the internal friction or damping effect and of the stiffness of the material as a function of the temperature.

Although an illustrative embodiment of the invention, and several modifications thereof, have been described in detail herein, it is to be understood that the invention is not limited thereto, and that various changes and other modifications may be effected therein by one skilled in the art without departing from the scope or spirit of the invention as defined in the appended claims.

What is claimed is:

1. A device for determining the internal friction of a material and which comprises a torsional oscillator for oscillation from a neutral position to periodically twist a test piece of the material which supplies at least part of a force for restoring the oscillator to said position, sensing means responsive to said oscillation to generate signals which, at any instant, are proportional to the instantaneous value of a characteristic of said oscillating, amplifier means with a variable gain, means receiving said signals generated by the sensing means and supplying, as input to said amplifier means, corresponding signals which are proportional to the instantaneous velocity of said oscillation, said amplifier means producing amplified output signals which are proportional to and in phase with the input signals, driving means actuated by said amplified output signals to influence the oscillation of said torsional oscillator by exerting thereon a driving force which varies linearly with said output signals and hence, at any instant, is proportional to the instantaneous velocity of said torsional oscillator so that the exertion of said driving force avoids deviation of the actual frequency of oscillation from a resonance frequency determined solely by the sum of the stiffnesses of the system consisting of said oscillator and said test piece and by the polar mass inertia moment of the system, and means actuated by said signals from the sensing means to compare the actual amplitude of said oscillation with a pre-set value thereof and being operative upon a deviation of said actual amplitude from said pre-set value to adjust said gain of the amplifier means in the sense for restoring the actual amplitude of oscillation to said pre-set value.

2. A device according to claim 1, in which said signals generated by said sensing means are proportional, at any instant, to the instantaneous velocity of said oscillator, and said means receiving said signals generated by the sensing means consists of conducting means extending from said sensing means to the input of said amplifier means.

3. A device according to claim 2, in which said means to adjust the gain of the amplifier means includes means integrating said signals from the sensing means to derive therefrom signals dependent on the actual amplitude of oscillation, means generating a constant signal corresponding to said pre-set value of amplitude, and means operative, during each period of oscillation, to compare the amplitude dependent signal with said constant signal and in the event of a difference between the compared signals, to adjust said gain in the sense to eliminate said difference.

4. A device according to claim 2, in which said amplifier means includes a D.C. voltage amplifier compensated for drift.

5. A device according to claim 2, in which said sensing means includes at least one fixed yoke of magnetic material defining an air gap, an energizing coil on said yoke adapted for connection to a source of constant D.C. current to establish a stationary magnetic field in said gap, and a coil secured to said torsional oscillator and being freely movable in said gap in response to said oscillation, said movable coil being positioned with respect to the axis of oscillation of said oscillator and said field in the air gap so that, upon movement of said movable coil in response to said oscillation, there is induced therein a variable voltage constituting said signals proportional to the instantaneous velocity of oscillation.

6. A device according to claim 2, in which said sensing means includes two fixed yokes of magnetic material at diametrically opposed locations with respect to the axis of oscillation of said oscillator, each of said yokes defining an air gap and having an energizing coil adapted for connection to a source of constant D.C. voltage to establish a stationary magnetic field in the related gap directed radially with respect to said axis, two coils secured to said torsional oscillator in diametrically opposed relation and being freely movable in opposed directions transversely with respect to said fields in the gaps of said two yokes in response to said oscillation, said movable coils being oriented with respect to said axis to have voltages induced therein by said fields upon movements transversely with respect to the latter, and said movable coils being connected in series to said input of the amplifier means so that the voltages induced therein by said movements in opposed directions in response to said oscillation are added to each other at said input, whereby voltages induced in said movable coils by simultaneous vibrational movements thereof in the same direction transversely with respect to said fields cancel each other.

7. A device according to claim 6, in which said driving means includes two other fixed yokes of magnetic material at diametrically opposed locations with respect to said axis between said locations of the yokes of said sensing means, each of said other fixed yokes defining an air gap and having an energizing coil adapted for connection to a source of constant D.C. voltage to establish a stationary magnetic field in the related air gaps, and two other coils secured to said oscillator in diametrically opposed relation between said coils of the measuring means to move freely in the gaps of said two other yokes, said two other coils being connected with said output of the amplifier means and arranged in relation to said axis of the oscillator to exert driving forces which combine to produce a turning movement on said oscillator in response to each of said output signals.

8. A device according to claim 1, in which said driving means includes at least one fixed yoke of magnetic material defining an air gap and having an energizing coil adapted to be connected to a source of constant D.C. voltage for establishing a stationary magnetic field in said gap, and a driving coil movable freely in said gap and being secured to said oscillator, said coil being connected to said amplifier means to receive said ouput signals therefrom and being arranged in relation to the axis of oscillation and said field to exert a driving force resulting in a turning movement acting on said oscillator in response to each output signal and varying linearly with the latter.

9. A device according to claim 1, in which said oscillator includes a body, suspension means suspending said body vertically from its upper end and presenting a low resistance to oscillation of said body about its central, vertical axis, said body having clamp means at its lower end for connection to the test piece to be periodically twisted upon said oscillation, and weights mounted on said body for adjustment radially with respect to the body to vary the polar mass movement of inertia of the oscillator and to locate the center of gravity of the oscillator in said axis.

References Cited

UNITED STATES PATENTS

| | | | |
|---|---|---|---|
| 2,142,854 | 1/1939 | La Pierre | 73—59 |
| 2,836,060 | 5/1958 | Ciringione et al. | 73—99 |
| 3,313,148 | 4/1967 | Dautreppe et al. | 73—99 |
| 3,382,706 | 5/1968 | Fitzgerald et al. | 73—59 |

RICHARD C. QUEISSER, Primary Examiner

J. P. BEAUCHAMP, Assistant Examiner

U.S. Cl. X.R.

73—99